(12) United States Patent
Kim

(10) Patent No.: US 12,090,942 B2
(45) Date of Patent: Sep. 17, 2024

(54) PERSONAL MOBILITY DEVICE AND METHOD OF CONTROLLING STABILITY USING THE SAME

(71) Applicants: Hyundai Motor Company, Seoul (KR); Kia Corporation, Seoul (KR)

(72) Inventor: So Jeong Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 469 days.

(21) Appl. No.: 17/389,955

(22) Filed: Jul. 30, 2021

(65) Prior Publication Data

US 2022/0055563 A1 Feb. 24, 2022

(30) Foreign Application Priority Data

Aug. 20, 2020 (KR) .................. 10-2020-0104505

(51) Int. Cl.
*B60R 21/015* (2006.01)
*B60R 21/01* (2006.01)
(Continued)

(52) U.S. Cl.
CPC ........ *B60R 21/01526* (2014.10); *B62K 17/00* (2013.01); *G06Q 10/02* (2013.01);
(Continued)

(58) Field of Classification Search
CPC .... B60R 21/01526; B60R 2021/01252; B62K 17/00; B62K 2202/00; B62K 3/002;
(Continued)

(56) References Cited

U.S. PATENT DOCUMENTS

2003/0015976 A1   1/2003 Chen
2017/0225673 A1*  8/2017 Cho .................... B60W 10/184
(Continued)

FOREIGN PATENT DOCUMENTS

CN   107798581 A   3/2018
CN   107945089 A   4/2018
(Continued)

OTHER PUBLICATIONS

Lee Won Seok; Electric Kickboard Automatic Braking System to Prevent Multiple Riders Boarding; KR-20200109009-A—English Translation (Year: 2019).*

*Primary Examiner* — Scott A Reinbold
(74) *Attorney, Agent, or Firm* — MORGAN, LEWIS & BOCKIUS LLP

(57) ABSTRACT

A personal mobility device configured for preventing a plurality of occupants from riding therein and a method of controlling stability therefor, may include a sensor unit including a plurality of sensors configured to detect a current boarding weight on the personal mobility apparatus, a pressure applied to a deck, and a driving speed, a communication unit configured to transmit and receive data to or from a communication terminal device of a user, and a controller configured to analyze information on a weight of the user, provided from the communication unit, and sensing information provided from the sensor unit, to determine whether a plurality of occupants rides in the personal mobility device, and to control an operation of the driving unit, preventing an accident when a plurality of occupants rides therein.

18 Claims, 9 Drawing Sheets

(51) Int. Cl.
  *B62K 17/00* (2006.01)
  *G06Q 10/02* (2012.01)
  *G06Q 50/40* (2024.01)
(52) U.S. Cl.
  CPC .... *G06Q 50/40* (2024.01); *B60R 2021/01252* (2013.01); *B62K 2202/00* (2013.01)
(58) Field of Classification Search
  CPC .... B62K 2204/00; B62K 11/00; G06Q 10/02; G06Q 50/30; B60L 2240/26; B60L 2250/22; B60L 15/20; B60L 50/60; B60L 2200/24; Y02T 10/64; Y02T 10/70; Y02T 10/72; Y02T 90/16; B62J 45/20; B62J 45/41; B62J 45/00; B62J 45/414; B62J 43/13; B62J 50/22; B62M 6/45; B62M 6/90; H04M 1/72403
  USPC .......................................................... 701/45
  See application file for complete search history.

(56) References Cited

U.S. PATENT DOCUMENTS

| | | | |
|---|---|---|---|
| 2019/0225298 A1* | 7/2019 | Takahashi | B62J 45/4151 |
| 2019/0248439 A1* | 8/2019 | Wang | B62K 11/10 |
| 2019/0367116 A1* | 12/2019 | Desberg | B62M 11/00 |
| 2021/0178914 A1* | 6/2021 | French | B60L 58/18 |
| 2021/0247196 A1* | 8/2021 | Wells | G06Q 50/30 |

FOREIGN PATENT DOCUMENTS

| | | | |
|---|---|---|---|
| CN | 106347564 B | | 9/2018 |
| CN | 107331008 B | | 9/2019 |
| KR | 10-1446833 B1 | | 10/2014 |
| KR | 20200109009 A | * | 3/2019 |

* cited by examiner

PERSONAL MOBILITY DEVICE AND METHOD OF CONTROLLING STABILITY USING THE SAME

The present application claims priority to Korean Patent Application No. 10-2020-0104505, filed on Aug. 20, 2020, the entire contents of which is incorporated herein for all purposes by this reference.

BACKGROUND OF THE INVENTION

Field of the Invention

The present invention relates to a personal mobility device configured for preventing a plurality of occupants from riding therein and a method of controlling stability using the same.

Description of Related Art

Technology for sharing economy as a part of the so-called fourth industrial revolution has been actively underway, and in particular, personal mobility is the field with the most active movement from private ownership to sharing.

In accordance with the trends, an electric two-wheeler such as an electric kickboard has been widely spread. In general, the electric kickboard is a representative personal mobility device and is configured for traveling at remarkably high speed than general walking speed. The electric kickboard collides with a protrusion on a forward surface or collides with an unpredicted geographical feature and loses the balance or falls, when driving at night. When two or more occupants ride in one electric kickboard, it is difficult to restore restoring force due to rapid steering manipulation, and when the electric kickboard overturns, accidents for which an occupant hurts easily occur.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a personal mobility device configured for preventing a plurality of occupants from riding therein and a method of controlling stability using the same.

Various aspects of the present invention are directed to providing a personal mobility device configured for preventing an accident when a plurality of occupants rides therein and a method of controlling stability therefor.

The technical problems solved by the exemplary embodiments are not limited to the above technical problems and other technical problems which are not described herein will become apparent to those skilled in the art from the following description.

In an aspect, various aspects of the present invention are directed to providing a personal mobility device includes a driving unit configured to control rotation of a wheel, a sensor unit including a plurality of sensors configured to detect a current boarding weight on the personal mobility apparatus, a pressure applied to a deck, and a driving speed, a communication unit configured to transmit and receive data to or from a communication terminal device of a user, and a controller configured to analyze information on a weight of the user, provided from the communication unit, and sensing information provided from the sensor unit, to determine whether a plurality of occupants rides in the personal mobility device, and to control an operation of the driving unit.

In another aspect, a method of controlling stability of a personal mobility device includes receiving information on a weight of a user from an authenticated communication terminal device of a user, receiving sensing values from a plurality of sensors included in a sensor unit, analyzing the information on the weight of the user and the sensing values and determining whether a plurality of occupants rides in the personal mobility device, and when determining that the plurality of occupants rides in the personal mobility device, controlling an operation of a driving unit of the personal mobility apparatus.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
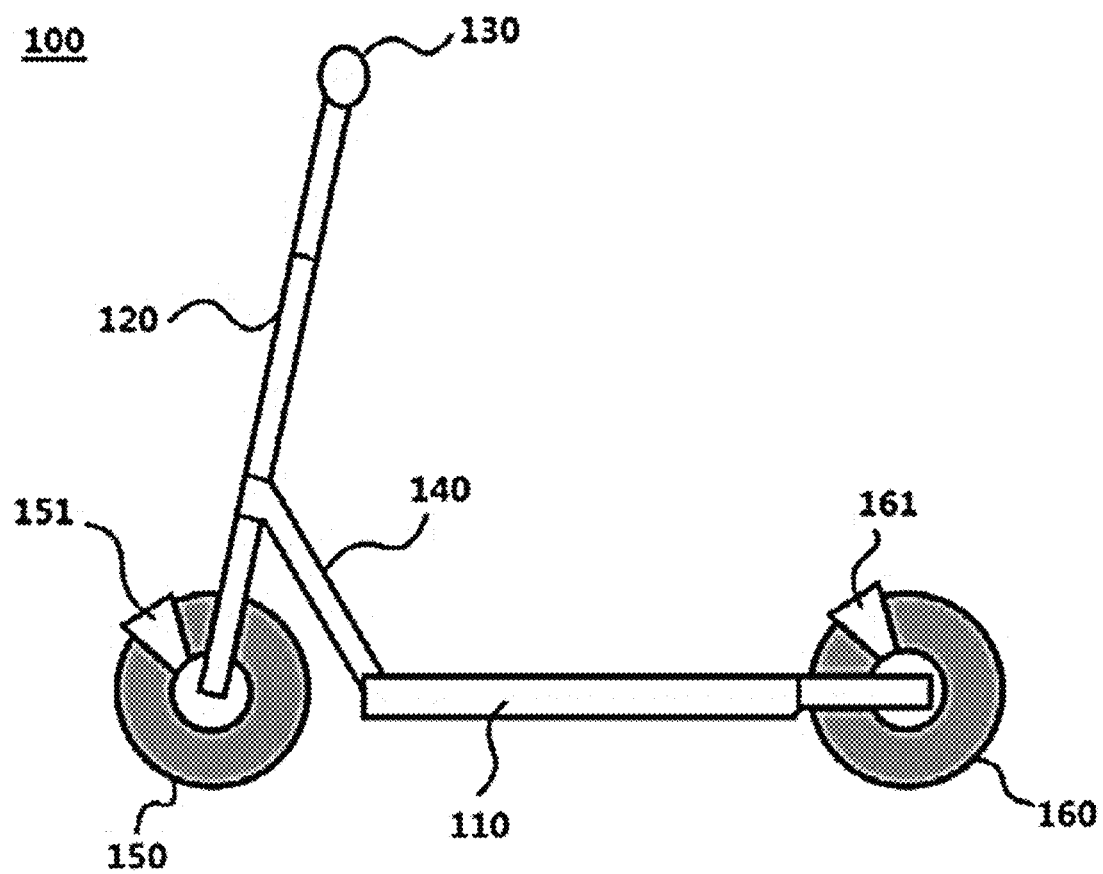
FIG. 1 is a diagram showing an example of the configuration of a personal mobility device applicable to exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present invention are described in detail for those of ordinary skill in the art to easily implement the present invention with reference to the accompanying drawings. However, the present invention may be implemented in various different forms and is not limited to these embodiments. To clearly describe the present invention, a part without concerning to the description is omitted in the drawings, and like reference numerals in the specification denote like elements.

Throughout the present specification, unless explicitly described to the contrary, the word "comprise" and variations such as "comprises" or "comprising", will be understood to imply the inclusion of stated elements but not the exclusion of any other elements. The same reference numbers will be used throughout the drawings to refer to the same or like parts.

According to exemplary embodiments of the present invention, although the case in which a personal mobility device is an electric kickboard has been described, this is for convenience of description, and the personal mobility device may be any device as long as the device includes a controller configured for controlling a driving unit of a transport device to be driven using a driving motor operated by power supplied from a battery provided therein.

FIG. 1 is a diagram showing an example of the configuration of a personal mobility device applicable to exemplary embodiments of the present invention.

Referring to FIG. 1, a personal mobility device 100 according to various exemplary embodiments of the present invention may broadly include a frame unit 110, 120, 130, and 140, and a wheel unit 150, 151, 160, and 161.

The frame unit may include a deck 110 on which a user steps on, a handlebar 130 connected to a front wheel 150 to steer the same, a steering tube 120 that the handlebar 130 is provided to penetrate, and a connector 140 for connecting the deck 110 and the steering tube 120.

The front wheel 150 may include a front-wheel brake 151, and a rear wheel 160 may include a rear-wheel brake 161. The front-wheel brake 151 and the rear-wheel brake 161 may apply a method using a brake pad attached to a brake disk and a caliper or may also use a drum-brake method, but the present invention is not limited thereto.

The front-wheel brake 151 and the rear-wheel brake 161 may be configured to apply braking force in a response to manipulation of brake levers that are generally disposed at opposite sides of the handlebar 130, respectively.

In general, the rear wheel 160 may be connected to a driving source (e.g., a driving motor) for providing driving force and may function as a driving wheel, but the present invention is not limited thereto. For example, the driving source may be connected to the front wheel 150 or may also be connected to both the front wheel 150 and the rear wheel 160.

Figure 2:
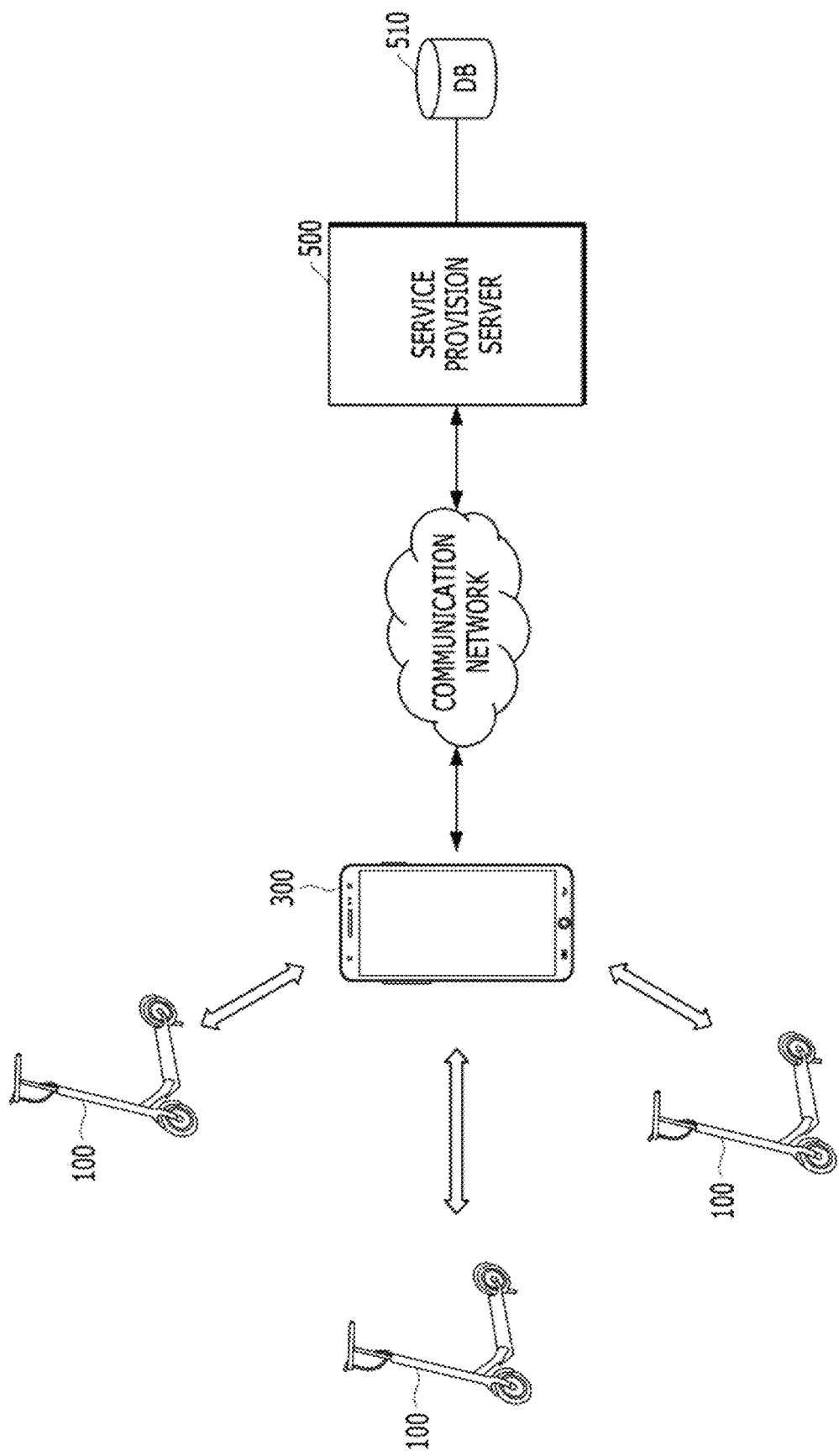
FIG. 2 is a schematic diagram showing an example of the configuration of a rental system for usage of a personal mobility device according to various exemplary embodiments of the present invention.

FIG. 2 is a schematic diagram showing an example of the configuration of a rental system for usage of a personal mobility device according to various exemplary embodiments of the present invention. As shown in the drawing, the personal mobility rental system may include a plurality of personal mobility devices 100 that are distributed in a predetermined area, a communication terminal device 300 of an occupant for transmitting and receiving data to or from the personal mobility device 100 using a wireless communication method, and a service provision server 500 for performing data communication with the communication terminal device 300 through a communication network. The service provision server 500 may include a database 510 for storing information on a user of the personal mobility rental system.

An electronic tag for recording an identification (ID) of the personal mobility device 100 for recognizing the personal mobility device 100 may be attached to one side of each personal mobility device 100.

An electric kickboard rental service application may be provided in the communication terminal device 300, and may have a function for recognizing the electronic tag attached to the personal mobility device 100.

The communication terminal device 300 may drive the rental service application of the personal mobility device 100 and may access the service provision server 500 through a communication network. The service provision server 500 may manage the rental and return of the personal mobility device 100 through the rental service application of the communication terminal device 300.

When the communication terminal device 300 recognizes the electronic tag of the personal mobility device 100, the rental service application may transmit a member ID of the occupant as well as the ID of the personal mobility device 100 recognized from the electronic tag, to the service provision server 500.

When the ID of the personal mobility device 100 and the member ID of the occupant correspond to each other, the service provision server 500 may process the rental of the personal mobility device 100.

Figure 3:
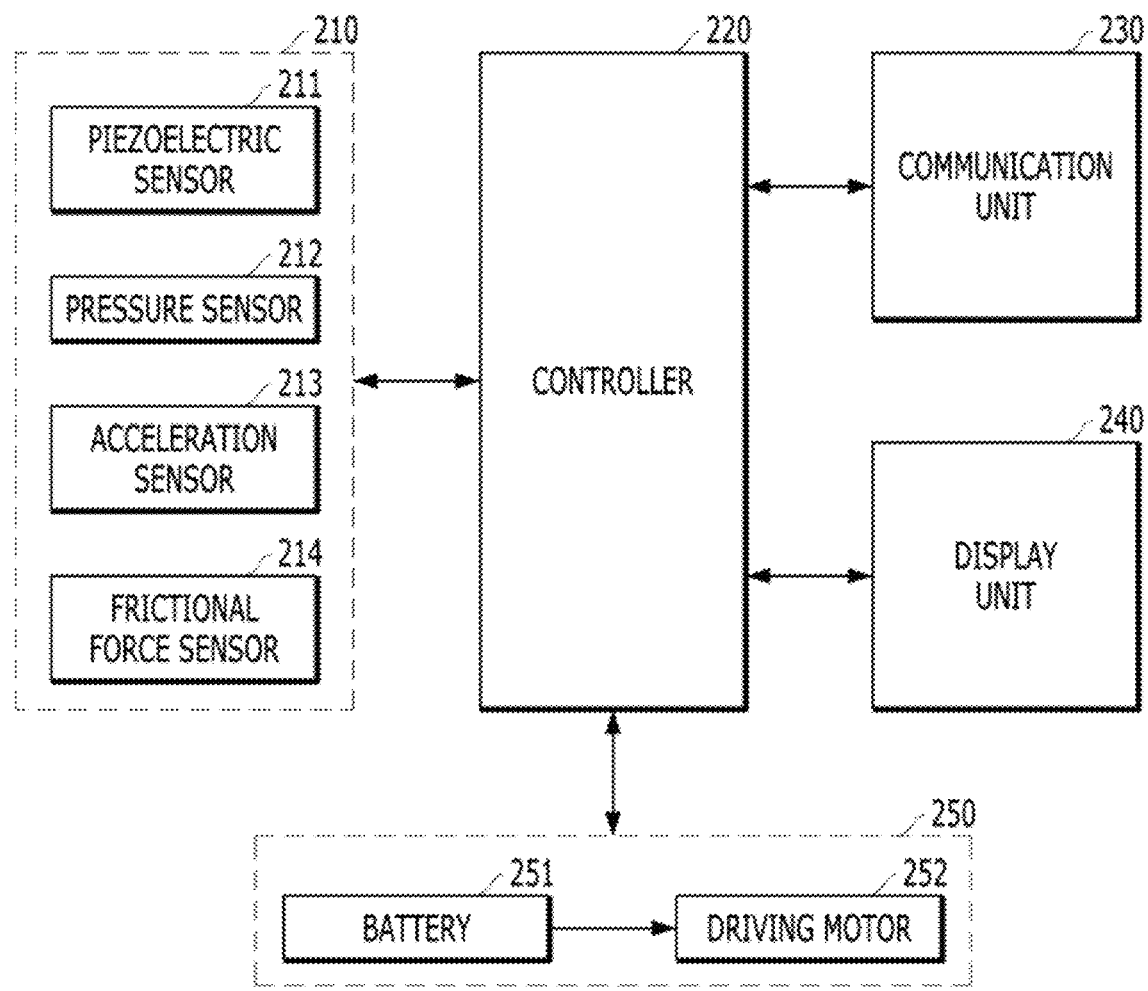
FIG. 3 is a block diagram functionally illustrating the configuration of a personal mobility device according to various exemplary embodiments of the present invention.

FIG. 3 is a block diagram functionally illustrating the configuration of a personal mobility device according to various exemplary embodiments of the present invention. As shown in the drawing, the personal mobility device according to various exemplary embodiments of the present invention may include a sensor unit 210, a controller 220, a communication unit 230, a display unit 240, and a driving unit 250.

The sensor unit 210 may include a plurality of sensors for sensing the weight and pressure of an occupant stepping on the deck. The sensor unit 210 may include a piezoelectric sensor 211, a pressure sensor 212, an acceleration sensor 213, and a frictional force sensor 214.

The piezoelectric sensor 211 may be disposed in the deck 110 and may acquire the total weight value of the occupant. The plurality of pressure sensors 212 may be disposed at different positions of an upper surface of the deck 110 or below the deck 110 and may be disposed parallel to each other along a longitudinal axis of the deck 110 to acquire information on distribution of pressure due to the weight of the occupant. Needless to say, the arrangement and position, and the shape of the piezoelectric sensor are exemplary, and the piezoelectric sensor may not be limited to the position and the shape thereof as long as the sensor is configured for acquiring the total weight of the occupant.

The acceleration sensor 213 may detect a driving speed of the personal mobility apparatus. The acceleration sensor 213 may be provided in the handlebar 130 of the personal mobility device 100. The frictional force sensor 214 may be attached to a wheel to measure frictional force between the wheel and a driving road depending on the state of a surface of the driving road.

The driving unit 250 for controlling rotation of a wheel may include a battery 251 provided in the deck and a driving motor 252 for driving the wheel using power supplied from the battery 251.

The communication unit 230 may transmit and receive data to or from the communication terminal device of the occupant. The communication unit 230 may include at least one wireless communication module of a short-distance wireless communication module such as Bluetooth communication, Zigbee communication, near field communication (NFC) communication, or wireless fidelity (WiFi), and a mobile communication module to be connected to a mobile radio communication network.

The communication unit 230 may perform short-distance wireless communication with the communication terminal device 300 of the occupant using the short-distance wireless communication module. The communication unit 230 may perform wireless communication with the service provision server 500 using the mobile communication module. The communication unit 230 may receive data of the user from a health care application executed by the communication terminal device of the user.

The controller 220 may analyze information on the weight of the occupant provided from the communication unit 230 and sensing information provided from the sensor unit 210. The controller 220 may determine whether a plurality of occupants rides in the personal mobility device. The controller 220 may control an operation of the driving unit 250 according to the determination result.

The controller 220 may transmit the result of whether the plurality of occupants rides in the personal mobility device to the communication terminal device 300 of the occupant through the communication unit 230. The controller 220 may include a memory for storing riding history information related to the user. The controller 220 may control the driving unit 250 according to the riding history information related to the user, stored in the memory.

The display unit 240 may display safety driving control information based on the result of the controller 220 about whether the plurality of occupants rides in the personal mobility device, to the occupant. In the instant case, the display unit 240 may include a sound device configured for outputting the safety driving control information in a form of voice.

According to various exemplary embodiments of the present invention, a method of controlling the stability of a personal mobility device configured for preventing a plurality of occupants from riding therein may include an operation of determining whether the plurality of occupants rides in the personal mobility device, by the personal mobility device, according to an exemplary embodiment or an operation of determining whether the plurality of occupants rides in the personal mobility device based on sensing information provided from the personal mobility device, by a service provision server, according to another exemplary embodiment of the present invention.

Figure 4:
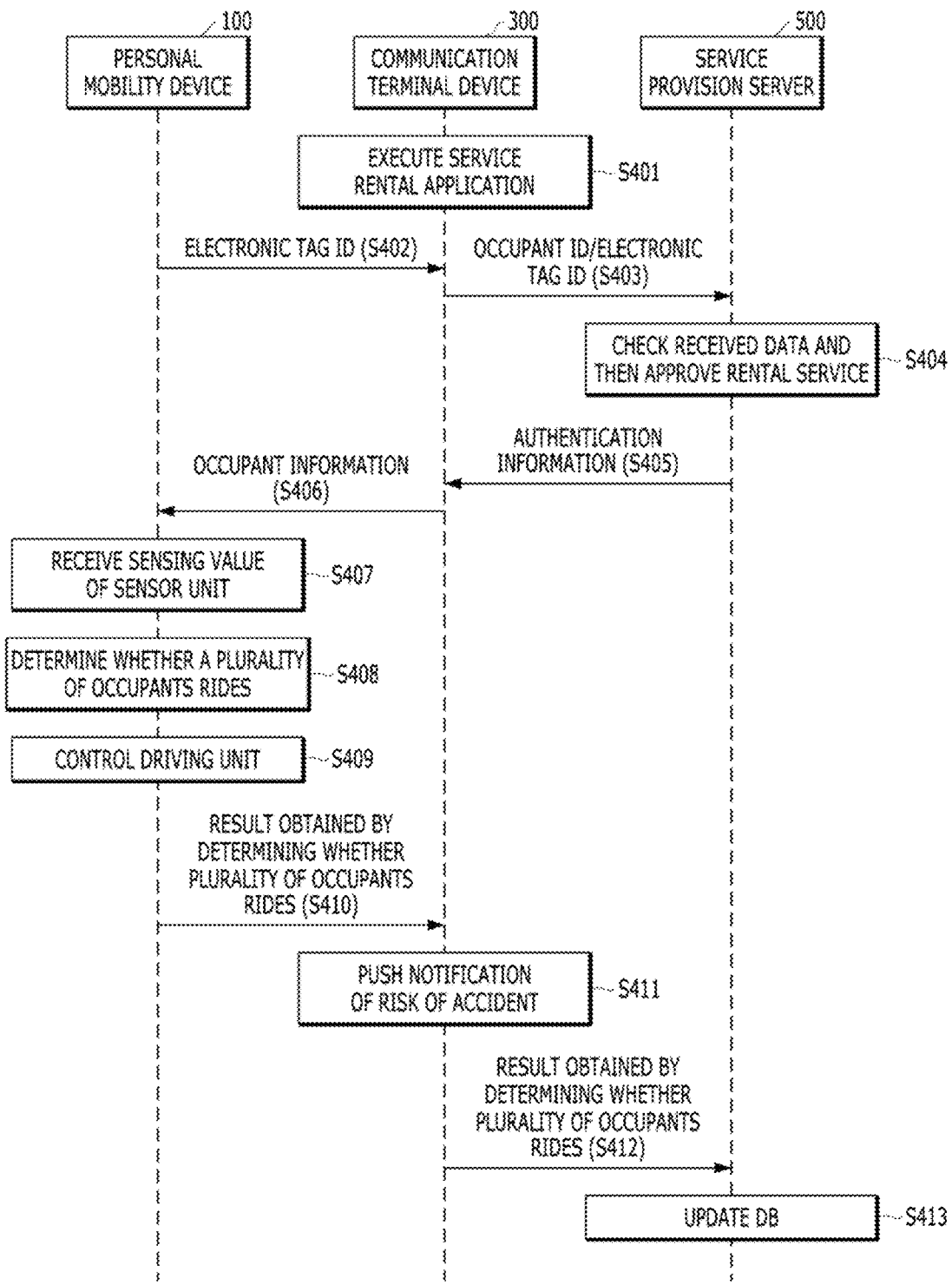
FIG. 4 is a diagram showing a relationship of operations of a system and shows operations of a method of controlling the stability of a personal mobility device according to various exemplary embodiments of the present invention.

FIG. 4 is a diagram showing a relationship of operations of a system and shows operations of a method of controlling the stability of a personal mobility device according to various exemplary embodiments of the present invention. That is, the drawing shows the relationship when the personal mobility device 100 determines whether a plurality of occupants rides in the personal mobility device.

A user of the personal mobility device 100 may drive a rental service application provided in the communication terminal device 300. The user refers to a person who utilizes the personal mobility device 100, and thus, in the following description, will be used interchangeably used with the "occupant". However, in consideration of the case in which a plurality of occupants ride in the personal mobility device, only an occupant who applies a service of the personal mobility device 100 is referred to as a "user" (S401).

The user may bring the communication terminal device 300 into contact with an electronic tag disposed on the personal mobility device 100. The communication terminal device 300 may receive electronic tag ID data of the personal mobility device 100 (S402) and may transmit user ID data including information on the weight of the user and the electronic tag ID data to the service provision server 500. A health care application is executed by the communication terminal device 300 of the user (S403).

The service provision server 500 may perform an authentication procedure on the data received from the communication terminal device 300 of the user, and may then approve the rental service (S404).

The rental service application driven in the communication terminal device 300 of the user may receive approval information (S405), and may then provide the information on the weight of the occupant to the personal mobility device 100 (S406).

The controller 220 provided in the personal mobility device 100 may receive information on a boarding weight, information on distribution of pressure, and information on speed from the sensors 211, 212, and 213 of the sensor unit 210 (S407).

The controller 220 may determine whether a plurality of occupants rides in the personal mobility device based on the data received from the sensors (S408).

When determining that the plurality of occupants ride in the personal mobility device, the controller 220 may control the driving unit 250 to stop the personal mobility device 100.

The controller 220 may control the communication unit 230 to transmit the result of whether the plurality of occupants rides in the personal mobility device to the communication terminal device 300 of the user (S410).

The possibility of risk of an accident may be displayed in a form of a push notification through the rental service application of the communication terminal device 300. In the instant case, the risk when the plurality of occupants rides in the personal mobility device may also be indicated in a form of voice (S411).

The rental service application of the communication terminal device 300 may transmit the result of whether the plurality of occupants rides in the personal mobility device (S412) to the service provision server 500 (S412).

The service provision server 500 may update user information stored in the database 510. The service provision server 500 may accumulate a number of times the user violates the rule about a plurality of occupants. When the accumulated number of times is greater than a predetermined number, the service provision server 500 may restrict authority to use the service of the user (S413).

Figure 5:
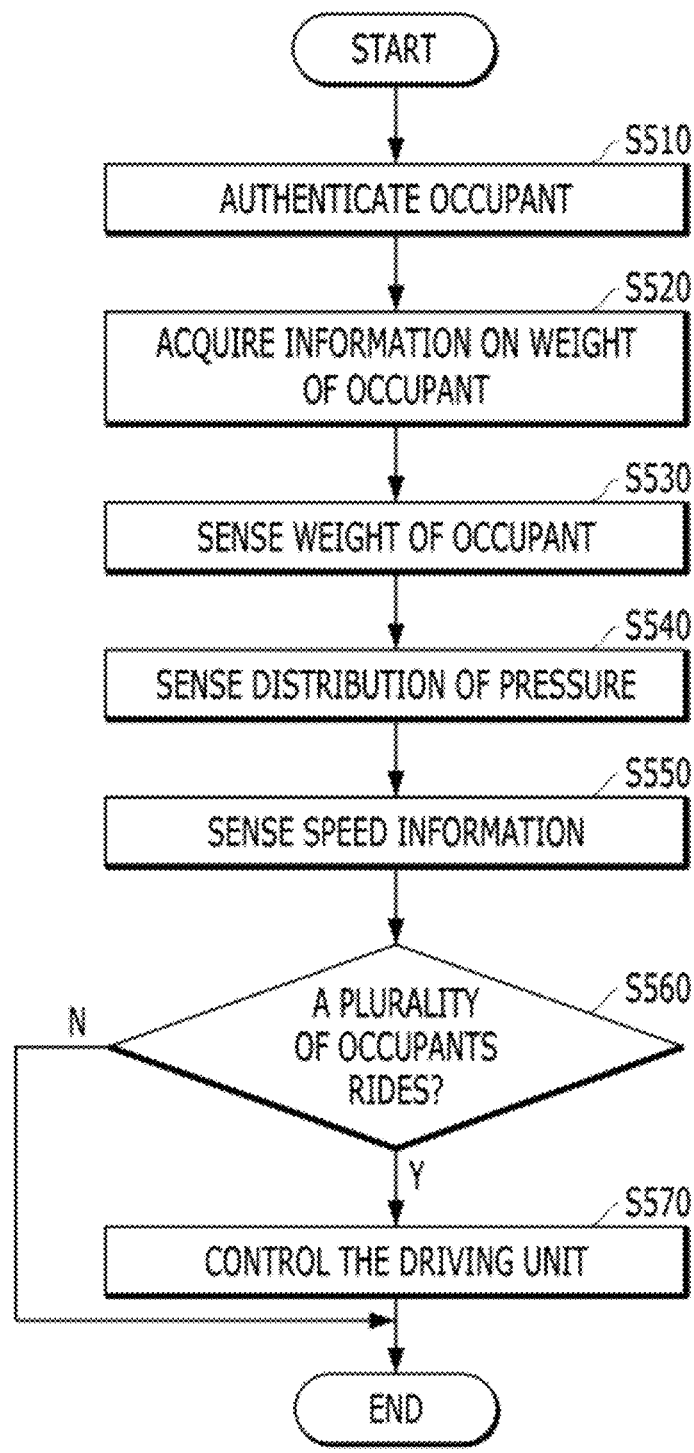
FIG. 5 is a flowchart of an operation of determining whether a plurality of occupants rides in a personal mobility device.

FIG. 5 is a flowchart of an operation of determining whether a plurality of occupants rides in the personal mobility device 100, by the personal mobility device 100, as shown in FIG. 4. The controller 220 in the personal mobility device 100 may be a subject of each operation.

As shown in the drawing, user authentication information may be received from the communication terminal device 300 of a user and the personal mobility device 100 may be converted into the state in which the personal mobility device 100 is configured for being driven (S510).

Information on the weight of an occupied user included in the user authentication information may be extracted (S520).

A value of the current boarding weight may be received from the piezoelectric sensor 211 of the sensor unit 210 (S530).

Information on distribution of pressure applied onto a deck may be received from the pressure sensor 212 of the sensor unit 210 (S540).

Information on the current driving speed may be received from the acceleration sensor 213 of the sensor unit 210 (S550).

The controller 220 may analyze information on each sensor and may determine whether a plurality of occupants rides in the personal mobility device (S560).

When determining that the plurality of occupants rides in the personal mobility device, the controller 220 may control the driving unit 250 to stop driving the personal mobility device 100 (S570).

Figure 6:
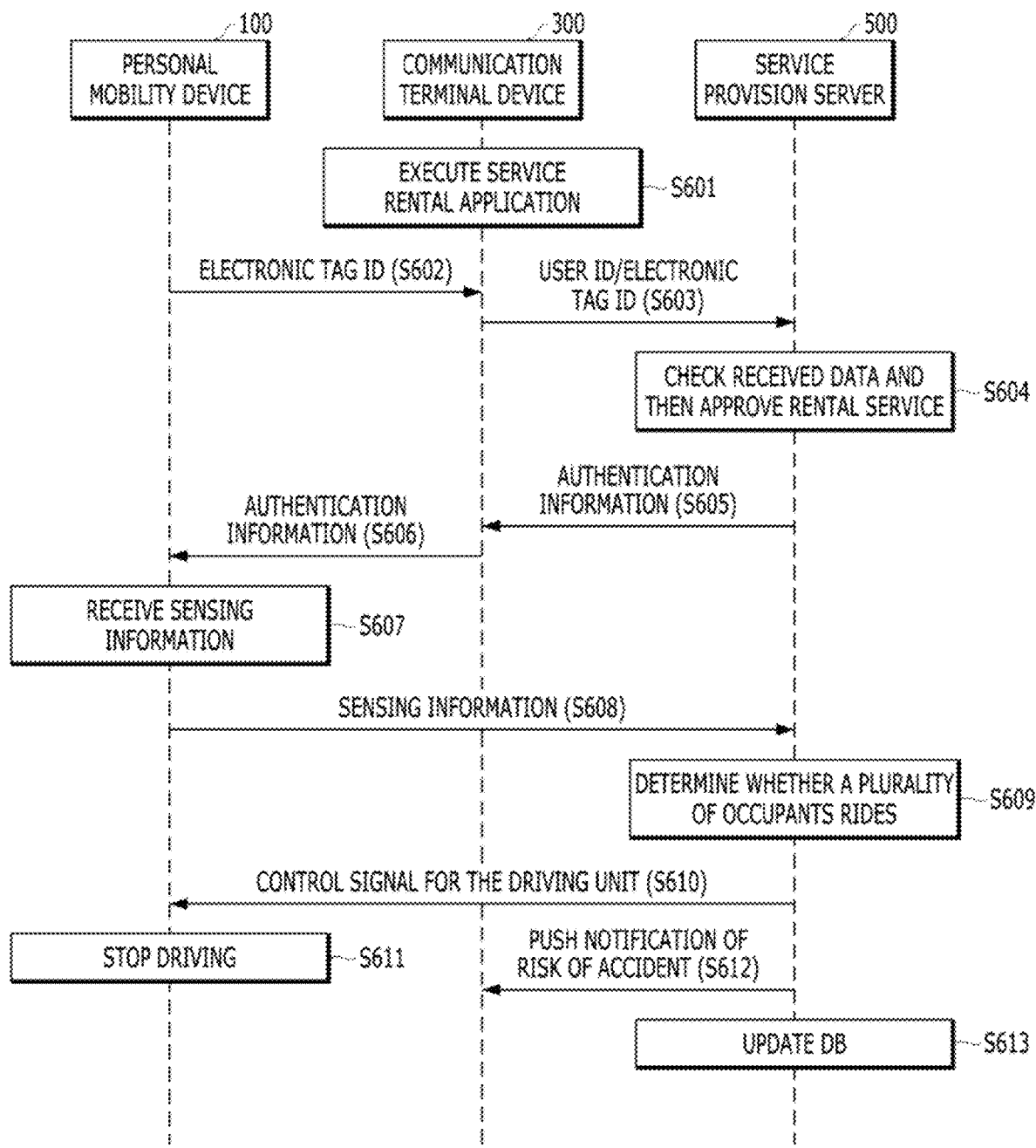
FIG. 6 is a diagram showing a relationship of operations of a system and shows operations of a method of controlling the stability of a personal mobility device according to various exemplary embodiments of the present invention.

FIG. 6 is a diagram showing a relationship of operations of a system and shows operations of a method of controlling the stability of a personal mobility device according to various exemplary embodiments of the present invention. That is, the drawing shows the relationship when the service provision server 500 determines whether a plurality of occupants rides in the personal mobility device.

A user of the personal mobility device 100 may drive a rental service application provided in the communication terminal device 300 (S601).

The user may bring the communication terminal device 300 into contact with an electronic tag disposed on the personal mobility device 100. The communication terminal device 300 may receive electronic tag ID data of the personal mobility device 100 (S602) and may transmit user ID data including information on the weight of the user and the electronic tag ID data to the service provision server 500 (S603).

The service provision server 500 may perform an authentication procedure on the data received from the communication terminal device 300 of the user, and may then approve the rental service (S604).

The rental service application driven in the communication terminal device 300 of the user may receive approval information (S605), and may then transmit approval information including the user information to the personal mobility device 100. In the instant case, information on average weight of the user may be transmitted through the health care application executed by the communication terminal device 300 (S606).

The personal mobility device 100 may receive information on the boarding weight, information on distribution of pressure, and information on speed from the sensors 211, 212, and 213 of the sensor unit 210 (S607).

The personal mobility device 100 may transmit sensing information to the service provision server 500 (S608).

The service provision server 500 may analyze the received sensing information and may determine whether a plurality of occupants rides in the personal mobility device (S609).

When determining that the plurality of occupants rides in the personal mobility device, the service provision server 500 may transmit a control signal for a driving unit to the personal mobility device 100 (S610).

The personal mobility device 100 may control the driving unit 250 to stop being driven, according to the received control signal (S611).

When determining that the plurality of occupants rides in the personal mobility device, the service provision server 500 may transmit the control signal to the communication terminal device 300 of the user to indicate a push notification of risk of an accident through the rental service application of the communication terminal device 300. In the instant case, the communication terminal device 300 of the user may also indicate the risk when the plurality of occupants rides in the personal mobility device in a form of voice (S612).

The service provision server 500 may update user information stored in the database 510. The service provision server 500 may accumulate a number of times the user violates the rule about a plurality of occupants. When the accumulated number of times is greater than a predetermined number, the service provision server 500 may restrict authority to use the service of the user (S613).

Figure 7:
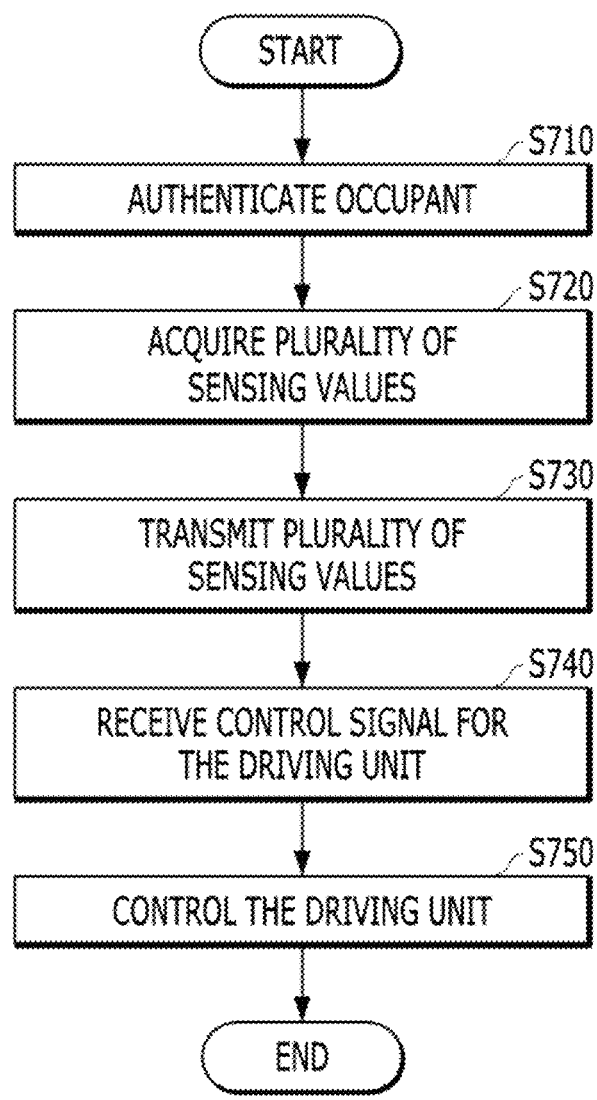
FIG. 7 is a flowchart of an operation performed by a controller of a personal mobility device when a service provision server determines whether a plurality of occupants rides in the personal mobility device.

FIG. 7 is a flowchart of an operation performed by the controller 220 of a personal mobility device when the service provision server 500 determines whether a plurality of occupants rides in the personal mobility device, as shown in FIG. 6.

As shown in the drawing, occupant authentication information may be received from the communication terminal device 300 and the personal mobility device 100 may be converted into the state in which the personal mobility device 100 is configured for being driven (S710).

A value of the current boarding weight, information on distribution of pressure applied to a deck, and information on the current driving speed may be received from the plurality of sensors 211, 212, and 213 of the sensor unit 210 (S720).

Sensing information may be transmitted to the service provision server 500 through the communication unit 230 (S730).

When determining that the plurality of occupants rides in the personal mobility device, the service provision server 500 may receive a control signal for a driving unit through the communication unit 230 (S740).

The driving unit 250 may be controlled to stop driving the personal mobility device 100 (S750).

Figure 8:
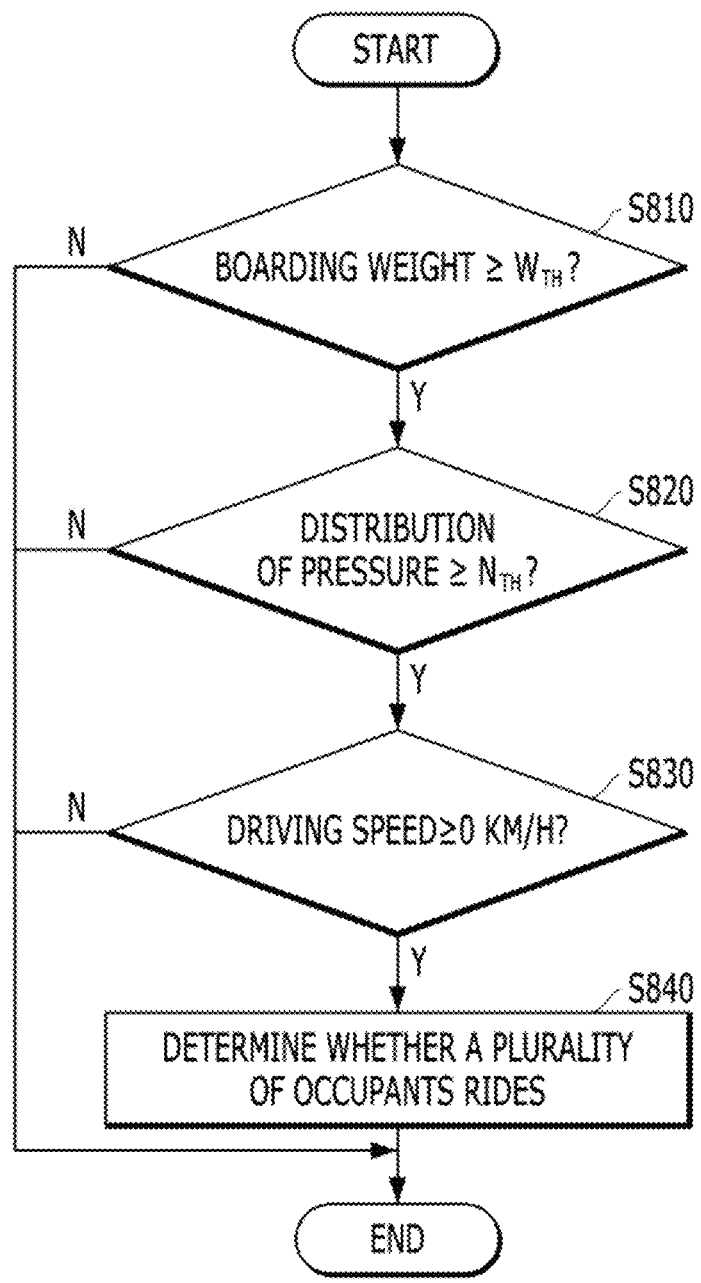
FIG. 8 is a flowchart of an operation of determining whether a plurality of occupants rides in a personal mobility device.

FIG. 8 is a flowchart of an operation of determining whether a plurality of occupants rides in the personal mobility device based on sensing information by the personal mobility device 100 or the service provision server 500 in FIG. 4 or 6.

Whether a value of the current boarding weight detected by the piezoelectric sensor 211 is equal to or greater than a threshold weight value $W_{th}$ may be determined. In the instant case, the threshold weight value $W_{th}$ may include a value obtained by adding the weight of clothes of the user and the weight of belongings to the average weight of the user of the rental service, or loading allowance of an object put on a deck. In the instant case, the threshold weight value $W_{th}$ may be determined as the average weight of occupied users of an error range of 5% to 10% (S810).

Whether the number of a plurality of pressure distributions provided from the plurality of pressure sensors 212 that are spaced from each other below the deck is equal to or greater than a threshold value $N_{th}$ may be determined. That is, in consideration of the case in which two occupants ride in the personal mobility device, the threshold value $N_{th}$ may be equal to or greater than 3 (S820).

Speed information may be received from the acceleration sensor 213 and whether the personal mobility device 100 starts driving may be determined. In general, the personal mobility device 100 travels at low speed, and thus, when the driving speed is equal to or greater than 0 km/h, the current state may be determined to be a driving state (S830).

When each threshold condition is satisfied in the above operations S810, S820, and S830, it may be determined that the plurality of occupants rides in the personal mobility device (S840).

Figure 9:
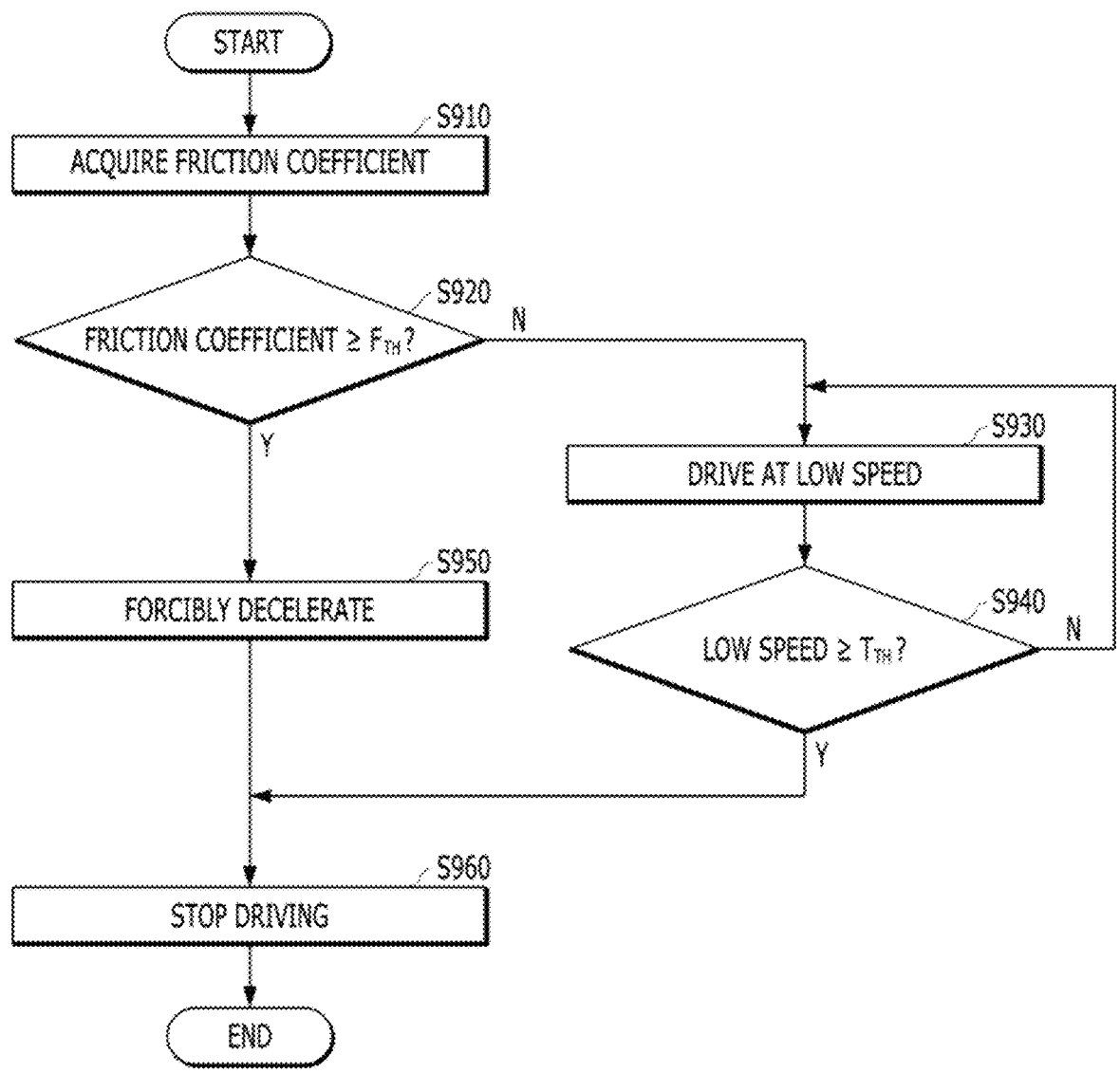
FIG. 9 is a flowchart showing an operation for controlling a driving unit when it is determined that a plurality of occupants rides in a personal mobility device.

FIG. 9 is a flowchart showing an operation for controlling a driving unit when it is determined that a plurality of occupants rides in a personal mobility device. A subject of the operation for controlling the driving unit when it is determined that the plurality of occupants rides in the personal mobility device may be the controller 220 of the personal mobility device 100.

A friction coefficient may be received from the frictional force sensor 214 disposed on a wheel of the personal mobility device 100 (S910).

A friction coefficient depending on the state of a surface of a driving road may be compared with a threshold value $F_{th}$. When the friction coefficient is greater than the threshold value $F_{th}$, the surface of the road may be in a poor state. The controller 220 may shut off electric power supplied to the driving motor 252 from the battery 251 and may forcibly reduce the speed of the personal mobility device 100 (S950).

When the friction coefficient is not greater than the threshold value $F_{th}$, the surface of the road may be in a good state. Electric power supplied to the driving motor from a battery may be controlled (S930).

In the instant case, the personal mobility device 100 may be driven at low speed to maintain the state in which the personal mobility device 100 is driven at a speed lower than a reference speed for a predetermined time period $T_{th}$ (S940).

After the personal mobility device 100 is driven to decelerate and is driven at low speed, the personal mobility device 100 stops being driven (S960).

The personal mobility device related to at least various exemplary embodiments of the present invention as configured above may prevent an accident when a plurality of occupants rides in the personal mobility device.

The personal mobility device related to at least various exemplary embodiments of the present invention may detect that a plurality of occupants simultaneously or sequentially rides in the personal mobility device and may control driving of the personal mobility device.

It will be appreciated by persons skilled in the art that the effects that could be achieved with the present invention are not limited to what has been particularly described hereinabove and other advantages of the present invention will be more clearly understood from the detailed description.

The present invention can also be embodied as computer readable code on a computer readable recording medium. The computer readable recording medium is any data storage device that can store data which can thereafter be read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy disks, and optical data storage devices.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The control device may be at least one microprocessor operated by a predetermined program which may include a series of commands for carrying out the method included in the aforementioned various exemplary embodiments of the present invention.

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A personal mobility apparatus comprising:
    a driver configured to control a rotation of a wheel mounted in the personal mobility apparatus;
    a plurality of sensors configured to detect a current boarding weight on the personal mobility apparatus and a driving speed of the personal mobility apparatus;
    a wireless receiver configured to transmit and receive data to or from a mobile phone of a user; and
    a controller configured to analyze information on a weight of the user provided from a service provision server through the wireless transceiver, and sensing information provided from the plurality of sensors, to determine whether a plurality of occupants rides in the personal mobility apparatus, and to control an operation of the driver according to the determination of whether the plurality of occupants rides in the personal mobility apparatus, wherein the controller determines whether the plurality of occupants rides the personal mobility apparatus when a result of a difference between the current boarding weight on the personal mobility apparatus and the information of the weight of the user provided from the service provision server is within an error range, wherein the controller determines whether the plurality of occupants rides the personal mobility apparatus when the personal mobility apparatus is in a driving state, and wherein the controller controls the driver to stop the personal mobility apparatus after driving the personal mobility apparatus at a speed lower than a reference speed for a predetermined time period when the current boarding weight on the personal mobility apparatus is greater than the weight of the user.

2. The personal mobility apparatus of claim 1, wherein the plurality of sensors includes:
a piezoelectric sensor disposed on a deck and configured to acquire a value of the current boarding weight;
a plurality of pressure sensors disposed on the deck and configured to acquire information on distribution of pressure due to a weight of an occupant;
an acceleration sensor configured to detect the driving speed; and
a frictional force sensor engaged to the wheel and configured to measure a frictional force between the wheel and a driving road according to a state of a surface of the driving road.

3. The personal mobility apparatus of claim 2, wherein the driver includes:
a battery; and
a driving motor connected to the battery and the wheel and configured to drive the wheel using electric power supplied from the battery.

4. The personal mobility apparatus of claim 3, wherein the controller is configured to analyze a result obtained by comparing the value of the current boarding weight detected by the piezoelectric sensor with a threshold value, the information on distribution of pressure detected by the plurality of pressure sensors, and a result value of detection of the acceleration sensor, and is configured to determine whether the plurality of occupants rides in the personal mobility apparatus.

5. The personal mobility apparatus of claim 4, wherein, upon determining that the plurality of occupants rides in the personal mobility apparatus, the controller is configured to control the electric power supplied to the driving motor from the battery to stop the driving motor or to stop the driving motor after driving the driving motor at the speed lower than the reference speed for the predetermined time period according to a result value obtained by comparing a friction coefficient detected by the frictional force sensor with a threshold coefficient value.

6. The personal mobility apparatus of claim 2, wherein the plurality of pressure sensors is disposed at different positions of the deck for supporting the occupant.

7. The personal mobility apparatus of claim 6, wherein the plurality of pressure sensors is disposed parallel to each other along a longitudinal axis of the deck.

8. The personal mobility apparatus of claim 1, further including:
a display configured to display safety driving control information according to a result of the controller about whether the plurality of occupants rides in the personal mobility apparatus, to the occupant.

9. The personal mobility apparatus 8, wherein the display includes a speaker configured to output the safety driving control information according to the result obtained by determining whether the plurality of occupants rides in the personal mobility apparatus.

10. The personal mobility apparatus of claim 1, wherein the wireless transceiver is configured to receive data of the user from a health care application executed in the mobile phone of the user.

11. The personal mobility apparatus of claim 1, wherein the controller includes a memory configured to store riding history information related to the user, and is configured to control the driver according to the riding history information stored in the memory.

12. A method of controlling stability of a personal mobility apparatus, the method comprising:
receiving, by a controller, information on a weight of a user from a service provision server through a mobile phone of the user;
receiving, by the controller, sensing values from a plurality of sensors included in the personal mobility apparatus, wherein the sensing values includes a value of a current boarding weight on the personal mobility apparatus;
comparing, by the controller, the information on the weight of the user and the value of a current boarding weight on the personal mobility apparatus and determining that a plurality of occupants rides in the personal mobility apparatus when the value of the current boarding weight on the personal mobility apparatus is greater than the weight of the user provided from the service provision server; and
upon determining that the plurality of occupants rides in the personal mobility apparatus, controlling, by the controller, an operation of a driver of the personal mobility apparatus,
wherein the controller determines whether the plurality of occupants rides the personal mobility apparatus when a result of a difference between the current boarding weight on the personal mobility apparatus and the information of the weight of the user provided from the service provision server is within an error range,
wherein the controller determines whether the plurality of occupants rides the personal mobility apparatus when the personal mobility apparatus is in a driving state, and
wherein the controller controls the driver to stop the personal mobility apparatus after driving the personal mobility apparatus at a speed lower than a reference speed for a predetermined time period when the current boarding weight on the personal mobility apparatus is greater than the weight of the user.

13. The method of claim 12, wherein the receiving the sensing values includes:
acquiring information on distribution of pressure due to a weight of an occupant on the personal mobility apparatus; and
receiving a driving speed of the personal mobility apparatus.

14. The method of claim 13, wherein the determining whether the plurality of occupants rides in the personal mobility apparatus includes:
- determining whether a difference between an acquired value of the current boarding weight and the information on the weight of the user is within an error range;
- determining whether a number of pieces of acquired information related to the distribution of the pressure is equal to or greater than 3; and
- determining whether a wheel of the personal mobility apparatus is in a driving state.

15. The method of claim 13, wherein the controlling the operation of the driver includes:
- comparing a friction coefficient of the wheel depending on a state of a surface of a driving road with a threshold value;
- upon determining that the friction coefficient is beyond a threshold range, shutting off electric power supplied from a battery connected to the driver to stop driving a driving motor of the driver; and
- upon determining that the friction coefficient is within the threshold range, controlling the electric power supplied from the battery to the driving motor to drive at the speed lower than the reference speed for the predetermined time period before shutting off the electric power supplied from the battery to the driving motor.

16. The method of claim 12, further including:
- displaying, by the controller, safety driving control information according to a result obtained by determining whether the plurality of occupants rides in the personal mobility apparatus, to the occupant.

17. The method of claim 16, further including:
- outputting the safety driving control information to the occupant in a form of voice.

18. A computer-readable recording medium having recorded thereon a program for executing the method of claim 12.

* * * * *